United States Patent [19]

Taylor, Jr.

[11] Patent Number: 4,887,633
[45] Date of Patent: Dec. 19, 1989

[54] FLUID FILL VALVE FOR FLUID INFLATABLE CHAMBERS AND TOILET TANKS

[76] Inventor: Lundy S. Taylor, Jr., 6916 Elbrook Rd., Lanham, Md. 20206

[21] Appl. No.: 363,640

[22] Filed: Jun. 8, 1989

[51] Int. Cl.⁴ .............................................. F16K 15/20
[52] U.S. Cl. ....................................... 137/225; 5/451; 5/453; 141/114; 141/212; 137/433
[58] Field of Search .............................. 114/183 R, 345; 141/114, 212, 213, 216, 382; 5/451, 453; 137/223, 224, 225, 409, 430, 433; 138/93

[56] References Cited

U.S. PATENT DOCUMENTS

| 740,515 | 10/1903 | Benson | 137/433 |
| 918,314 | 4/1909 | Griffin | 137/433 |
| 2,024,780 | 12/1935 | Ruckman | 137/225 |
| 2,874,734 | 2/1959 | Luckock et al. | 141/356 |
| 4,122,869 | 10/1978 | Roberson, Sr. | 138/93 |
| 4,212,335 | 7/1980 | Bova | 141/382 |
| 4,316,489 | 2/1982 | Price | 5/451 |
| 4,417,598 | 11/1983 | DePirro | 138/93 |
| 4,766,628 | 8/1988 | Walker | 5/453 |

Primary Examiner—George L. Walton

[57] ABSTRACT

An elongated valve assembly is provided including inlet and outlet ends. The inlet end includes structure for fluid-tight sealed engagement with and support from the wall portions of a chamber defining a fluid inlet port with the outlet end of the valve assembly projecting into the chamber. The valve assembly includes a valve member longitudinally reciprocal therein between open and closed positions and having a portion thereof extendible and retractable relative to the valve assembly outlet end responsive to movement of the valve member between the closed and open positions, respectively, thereof.

5 Claims, 2 Drawing Sheets

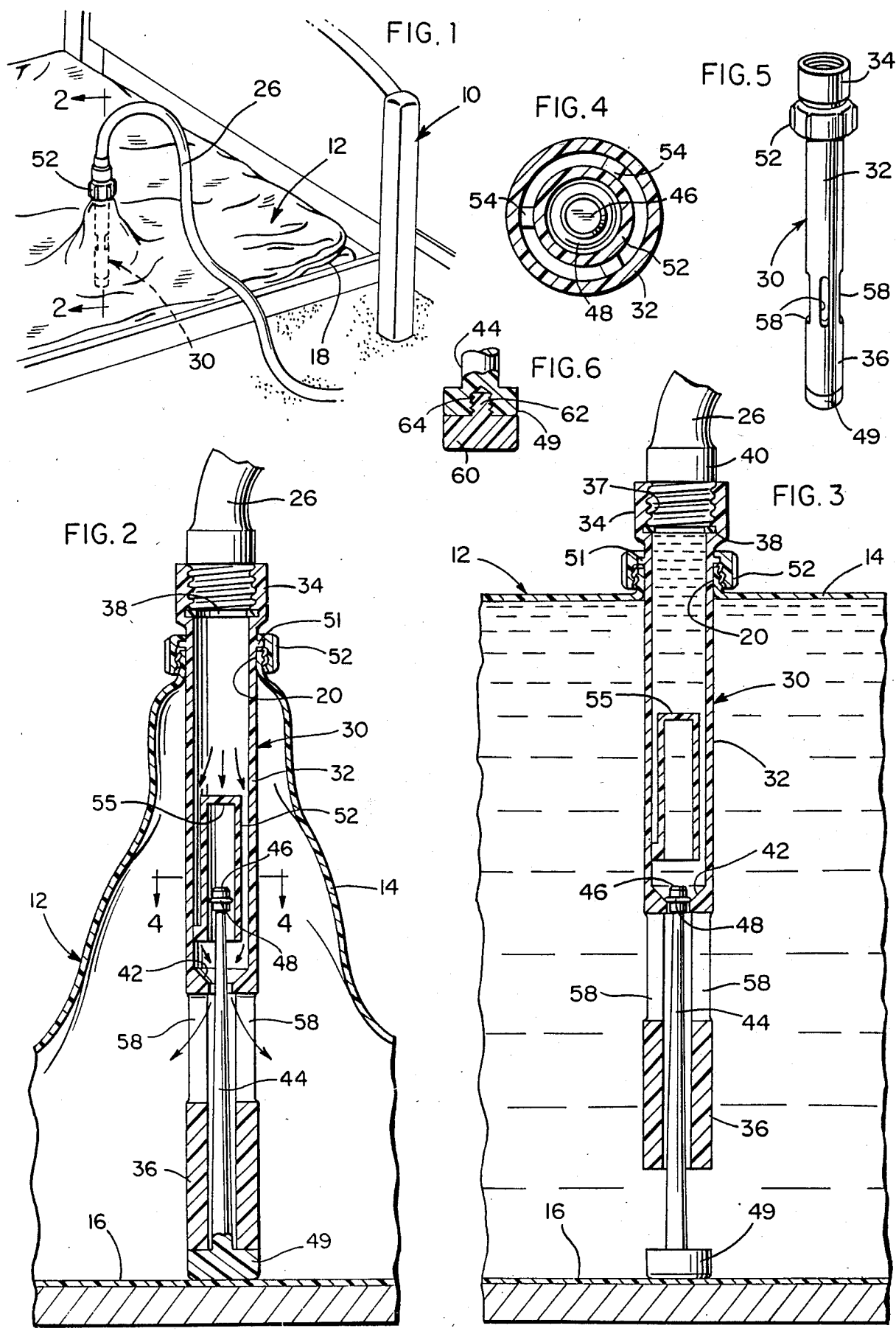

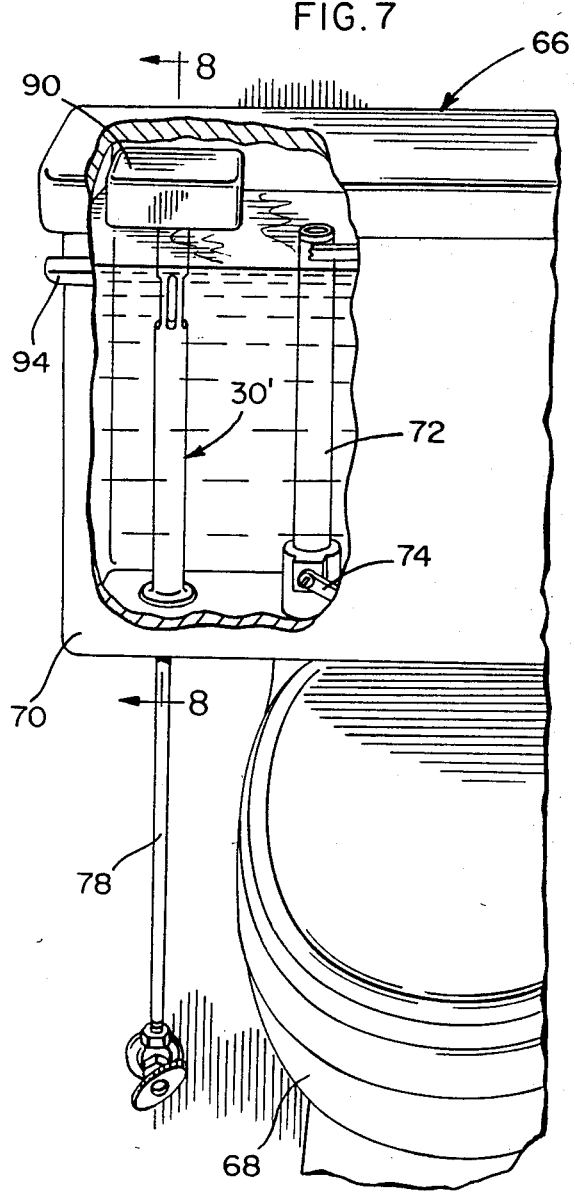
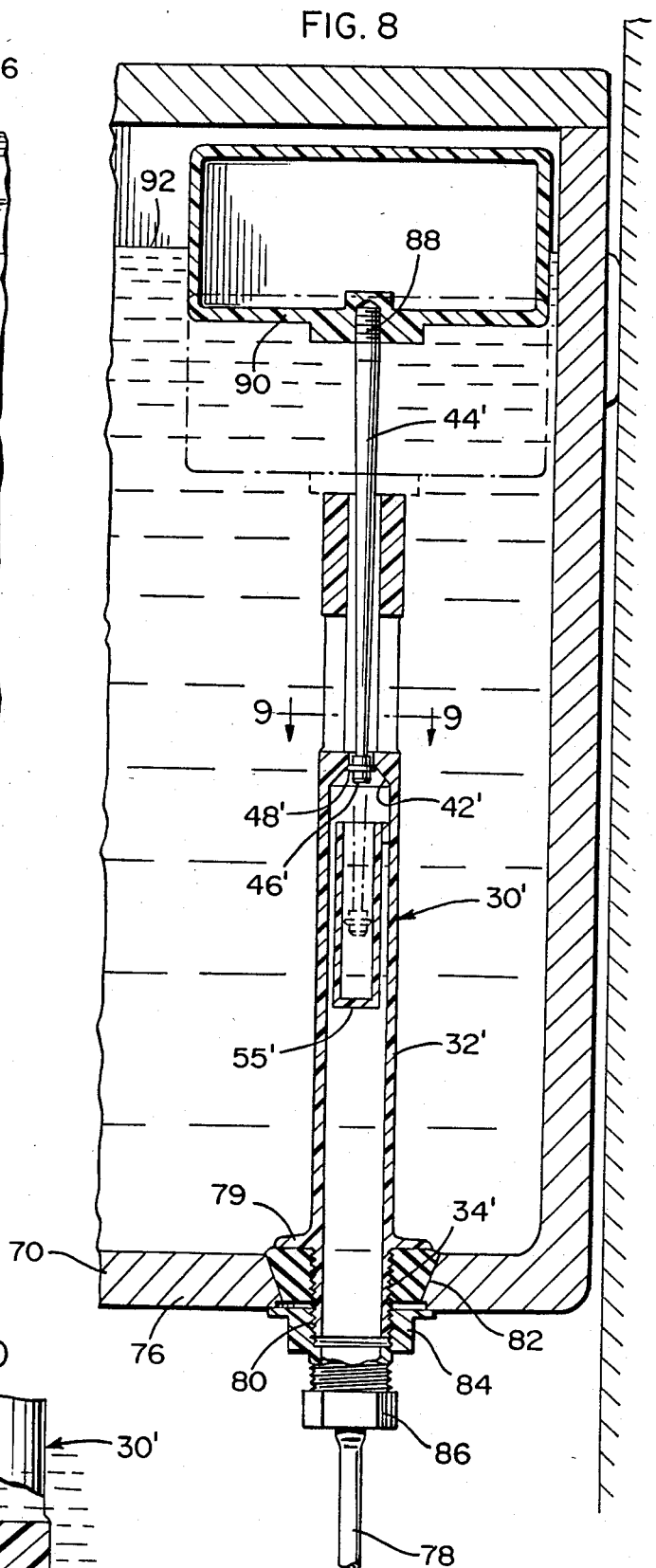
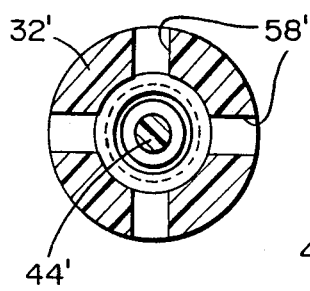
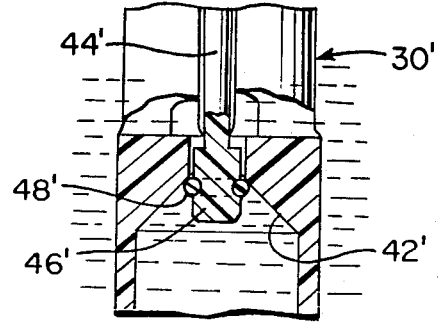

FLUID FILL VALVE FOR FLUID INFLATABLE CHAMBERS AND TOILET TANKS

BACKGROUND OF THE INVENTION

1. Field of The Invention

This invention relates to a fluid fill valve for fluid inflatable devices, such as waterbed mattresses and which also may be used as a water inlet valve for a toilet tank. The fill valve includes a gravity operated valve member when the fill valve is used as a waterbed mattress fluid fill valve and a buoyant valve member when the fill valve is used as a toilet tank fill valve.

2. Description of Related Art

Various different forms of fill valves and fittings including some of the general structural and operational features of the instant invention are disclosed in U.S. Pat. Nos. 478,698, 2,128,734, 2,874,734, 4,212,335 and 4,270,727. However, these previously known devices do not include the combination of structural features incorporated in the instant invention and are not operative in same manner.

SUMMARY OF THE INVENTION

When it is desired to fill the mattress of a waterbed, a fill fitting such as that disclosed in U.S. Pat. No. 4,212,335 is utilized and a supply of water under pressure is connected to the fill fitting through the utilization of a flexible supply hose.

Usually, the inlet end of the flexible supply hose is connected to a domestic water supply outlet through the utilization of suitable adaptor fittings and the valve controlling of the domestic water supply outlet is then opened in order to allow the waterbed mattress to be filled.

However, considerable time is required to fill a waterbed mattress and it is imperative that the mattress not be over filled (inflated with water) in order to prevent the mattress from bursting. Therefore, throughout the considerable time required to fill a waterbed mattress the person filling the mattress must be constantly attentive to the task at hand.

However, intermittent distractions such as children, telephones and household pets can distract a person filling a waterbed mattress as the mattress is approaching the state of being completely filled with water and accidents occur resulting in waterbed mattress bursting under household water pressure which is usually about 60 to 70 psi.

Once a waterbed mattress has burst, as a result of excessive fill pressures, it is no longer serviceable and must be replaced. In addition, there is also the task of mopping up or otherwise containing the water spill resulting from a ruptured waterbed mattress.

Further, considerable water is wasted annually as a result of leaking toilet tank fill valves.

Accordingly, there is a need for a waterbed mattress fill valve which will automatically close and terminate the flow of domestic water under pressure to a waterbed mattress as the mattress approaches the properly water inflated condition thereof. Also, there is a need for a toilet water tank fill valve whose structure and operation will positively and more reliably terminate the flow of water into a toilet water tank as the water tank is filled to the proper level.

The main object of this invention is to provide a waterbed fill valve which will automatically terminate the flow of water from a domestic water supply into a waterbed mattress as the waterbed mattress reaches the proper water inflated condition thereof.

Another object of this invention is to provide a waterbed mattress fill valve in accordance with the preceding object and which may used to fill a waterbed mattress in substantially the same matter in which conventional waterbed mattress fill fittings are used.

Still another of this invention is to provide a waterbed mattress fill valve in accordance with the preceding objects and which may be adjusted prior to a waterbed mattress filling operation for the varying the degree of inflation of a waterbed mattress as a result of being water filled by the fill valve.

A further object of this invention is to provide a fill valve for a toilet water tank which will reliably terminate the flow of water into the fill tank upon the level water in within the fill tank reaching a predetermined level.

A final object of this invention to be specifically enumerated herein is to provide a fill valve in accordance with the preceding objects and which will conform to conventional forms of manufacture, be of simple construction and easy to use so as to provide a device that will economically feasible, long lasting, and relatively trouble free in operation.

These together with other objects and advantages which will become subsequently apparent reside in the details of construction and operation as more fully herein after described and claimed, reference being had to the accompanying drawings forming a part hereof, wherein like numerals refer to like parts throughout.

BRIEF DESCRIPTION OF THE DRAWINGS

FIG. 1 is a fragmentary perspective view illustrating the manner in which the fill valve of the instant invention may be utilized to automatically properly water inflate a waterbed mattress;

FIG. 2 is an enlarged fragmentary vertical sectional view taken substantially upon the plane indicated by the section line 2—2 of FIG. 1 and illustrating the fill valve during the initial stage of filling the waterbed mattress;

FIG. 3 is an enlarged fragmentary perspective view similar to FIG. 2 but illustrating the fill valve and mattress after proper water inflation of the mattress;

FIG. 4 is an enlarged horizontal sectional view taken substantially upon the plane indicated by the section line 4—4 of FIG. 2;

FIG. 5 is a perspective view of the fill valve with the valve member thereof in an open position;

FIG. 6 is an enlarged fragmentary vertical sectional view illustrating a modified form of valve member for the fill valve including a removable extension thereon to adjust the amount of inflation of a waterbed mattress by the water fill valve of the instant invention;

FIG. 7 is a fragmentary perspective view of a toilet bowl and tank assembly with portions of the tank assembly being broken away and illustrating a toilet tank fill valve constructed in accordance with the present invention operatively associated with the water tank for filling the latter;

FIG. 8 is an enlarged fragmentary vertical sectional view taken substantially upon the plane indicated by the section line 8—8 of FIG. 7 and illustrating the valve member of the fill in alternate solid and phantom line positions;

FIG. 9 is an enlarged horizontal sectional view taken substantially upon the plane indicated by the section line 9—9 of FIG. 8;

FIG. 10 is a fragmentary side elevational view of the valve seat area of the fill valve illustrated in FIG. 9 and with parts of the valve assembly being broken away and illustrated vertical section.

DESCRIPTION OF THE PREFERRED EMBODIMENT

Referring now more specifically to the drawings, the numeral 10 generally designates a bed incorporating a waterbed mattress 12. The mattress 12 includes top and bottom panels or walls 14 and 16 joined by a peripheral wall or panel 18.

Conventionally, the top wall or panel 14 includes a fill port 20 defined by a fill neck 22 externally threaded as at 24 and normally closed through the utilization of an internally threaded cap (not shown).

Conventionally, a fill fitting such as disclosed in U.S. Pat. No. 4,212,335 is utilized to fill or water inflate the mattress 12 in conjunction with a flexible water hose. The fill fitting is supported from the neck 22 in position extending through the port 20 and the fitting serves to fluid-tight connect the discharge end of a flexible supply hose such as that indicated at 26 with the fill neck 22. The inlet end of the supply hose 26 is operatively connected with the outlet of a valved domestic water faucet or the like through the utilization of suitable adaptor fittings provided with the conventional fill fitting.

However, in as much as a conventional fill fitting, if left unattended, can result in the waterbed mattress 12 being over inflated with water with the result that the waterbed mattress 12 is ruptured, a need exist for a fill valve for a waterbed mattress that will automatically terminate the flow of water into the waterbed mattress as the waterbed mattress is properly water inflated.

The fill valve assembly of the instant invention is referred in general by the reference numeral 30 and incorporates an elongated tubular valve body 32 having inlet and outlet ends 34 and 36. The inlet end 34 of the valve body 32 is internally threaded as at 37 and provided with the usual sealing washer 38 for fluid-tight coupling of the outlet end 40 of the hose 26 to the inlet end 34.

The outlet end 36 of the valve body 32 includes a upstream facing frusto-conical valve seat 42 and an elongated valve member or rod 44 is loosely received through the valve seat 42 and includes an enlarged head 46 on its upstream end provided with a circumferential groove in which an O-ring 48 sealingly engageable with the seat 42 is retained. The valve member or rod 44 projects outwardly of the outlet end 36 of the tubular valve body 32 and includes an enlarged abutment or head 49 thereon engageable with the inner surface of the wall 16 opposite the wall 14 in which the fill port 20 is formed.

The inlet end 34 of the fill valve assembly 30 also includes an radially outwardly projecting and circumferentially extending abutment shoulder 50 and a nut-type fitting 51 which encompasses the abutment shoulder 50.

Also, the intermediate length portion of the valve body 32 includes a shield sleeve 52 centrally mounted therein through the utilization of mounting spider arms 54, the sleeve 52 being mounted within the valve body 32 in an upstream relation to the valve seat 42.

The upstream end of the shield sleeve 52 includes a closure end wall 55 and the downstream end of the shield sleeve 52 is open and loosely telescopingly receives the head 46 as well as the O-ring 48 therein when the valve member or rod 44 is disposed in its upstream limit position with the abutment or head 50 engaged with the end face 56 of the outlet end 36 of the valve body 32. The outlet end of the valve body 32 includes four radial slots 58 which function as water outlets when the valve member or rod 44 is upwardly displaced from the closed position thereof illustrated in FIG. 3, the lower end of the valve member or rod 44 also being loosely received through the outlet end 36 of the valve body 32.

With attention now invited more specifically to FIGS. 2 and 3 of the drawings, the fill valve assembly 30 is operatively associated with the fill neck 22 in the manner illustrated in FIG. 2 of the drawings with the nut-type fitting 52 threaded onto the fill neck 22 in order to establish a fluid-tight seal between the exterior of the valve body 32 and the fill port 20 of the fill neck 22. Thereafter, and with the inlet end of the hose 26 being operatively connected to the a suitable source of domestic water under pressure, the fill valve assembly 30 with its relatively shiftable components initially positioned as shown in FIG. 2 is used to fill (water inflate) the waterbed mattress 12. Water entering the upper or inlet end 34 of the valve body 32 passes downwardly through the valve body and between the exterior surfaces of the shield sleeve 52 and the internal surfaces of the valve body 32 and then down through the valve seat 42 and out of the outlet slots 58 and into the interior of the waterbed mattress 12. As the waterbed mattress 12 approaches being properly water inflated, the top wall 14 is elevated relative to the bottom wall 16 and as the top wall 14 is elevated the valve body 32 is elevated relative to the bottom wall 16 and the abutment or head 49 of the valve member or rod 44 remains in contact with the bottom wall 16 due to the force of gravity acting upon the valve member or rod 44.

As the top wall is further elevated relative to the bottom wall 16 and the valve body 32 continues to be elevated relative to the bottom wall 16, the head 46 and O-ring 48 move downwardly toward the lower end of the shield sleeve 32. As soon as the O-ring 48 on the valve head 46 drops to a position slightly below the lower end of the shield sleeve 32, the head 46 and O-ring 48 are subject to downward dynamic forces as result of the downward flow of water through the valve body 32 acting thereon and the valve body 32 is "snap" elevated relative to the valve member or rod 44 and the valve seat 42 moves smartly upwardly into engagement with the O-ring 48. Such action, of course, terminates the flow of water through the valve body 2 into the waterbed mattress 12 and the static pressure of the water acting upon the head 46 and O-ring 48 serves to ensure that the O-ring 48 of the valve head 46 tightly closes against the valve seat 42 to terminate the flow of water under pressure into the waterbed mattress 12.

The overall length of the fill valve assembly 30 from the shoulder 51 to the outer surface of the abutment or head 49, when the valve member or rod 44 is in its uppermost limit position, determines the amount of water which will admitted into the waterbed mattress 12 for water inflation of the same. If it is desired to have waterbed mattress 12 slightly more inflated with water in order to provide a more firm waterbed mattress, abutment or head extension 60 including a threaded shank 62 may be removably secured to the underside of the abutment or head 49 by having its shank 6 threadedly engaged in the threaded blind bore 64 formed in the outer face of the head or abutment 49.

With attention now more specifically to the FIGS. 7 through 10, there may be seen a toilet installation in general by reference numeral 66 and including a conventional toilet bowl 68 and conventional water tank 70. The interior of the water tank 70 includes an overflow pipe 72 as is conventional leading to the interior of the bowl 68 and the tank 66 also includes the usual flushing mechanism (not shown) operatively associated with a flapper valve 74 for discharging water from the tank 70 into the toilet bowl 68 for flushing the same.

A water tank usually is provided with a float operated valve assembly opening downwardly through the bottom wall 76 of the tank and having a valved water supply line operatively connected thereto for the purpose of admitting water into the tank 70 to a predetermined water level therein. However, these valve assemblies usually are unreliable after being in use for sometime and do not completely terminate the flow of water into the tank 70 and thus cause a constant flow of water from the interior of the tank 70 through the overflow pipe 72 and into bowl 68.

A second form of fill valve assembly 30' is illustrated in FIGS. 7 through 10 and comprises a substantial duplicate of the water fill valve assembly 30, except that the inlet end 34' of the valve assembly 30' includes a large abutment flange 79 and is externally threaded as at 80 for water tight securement through an opening 82 formed in the bottom wall 76 by an internally threaded nut-type fitting 84, see FIG. 8. The water supply line 78 is disposed in fluid-tight connection with the fitting 84 by a second nut-type fitting 86.

The fill valve assembly 30' is, of course, inverted and the end of the valve member or rod 44' thereof corresponding to the valve member or rod 44 does not include an abutment or head such as that indicated at 49 in FIGS. 2, 3 and 5, but is externally threaded as at 88 and threaded into a combination weight-float 90.

The desired water level in the tank 70 is indicated at 92 in FIG. 8 and when the buoyant weight-float 90 is in the solid line position thereof illustrated in FIG. 8 the valve member or rod 44 is elevated to the solid line position illustrated in FIG. 8 in which the O-ring 48' seats tightly against the valve seat 42' to terminate the flow of water into the tank 70. Of course, the static pressure of the water within the valve body 32' below the valve head 46' ensures that the valve assembly 30' will be tightly closed.

When the flushing mechanism 94 is actuated to flush the toilet bowl 68, the flap valve 74 opens and water is discharged from within the tank 70 into the bowl 68. The lowering of the water level 92 within the tank 70 causes the combined weight-float 90 to lower to the phantom line position thereof illustrated in FIG. 8 and the valve assembly 30' to open. When the water level within the tank is lowered sufficiently close to the bottom wall 76 the flap valve 74 closes and the water entering the tank 70 through the valve assembly 30' begins to rise within the tank 70. As the water level within the tank again reaches the level 92, the valve assembly 30' again closes.

It may thus be seen that a highly dependable valve assembly is provided for admitting water into a toilet water tank and that the valve assembly 30' is positive in closing action. Actually, as the weight-float 90 approaches the solid line position thereof illustrated FIG. 8, static and dynamic pressures of the water acting upon the head 46' and O-ring 48' actually will "snap close" the valve assembly 30'.

It is also pointed that the valve assembly 30' may be readily used to retro fit existing water tanks and that the valve assembly 30' incorporates only two relatively movable components. Furthermore, the valve body 32' could be constructed in two pieces removably threadedly joined together in order that separation of the valve body components from each other could be readily effected in order to quickly change the O-ring 48', if desired. Actually, the outlet end of the valve body 32' could be marketed together with a replacement O-ring 48' and, in such instance both the O-ring 48' and the valve seat 42' could be renewed if ever desired at a very low cost and without the use of tools.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to falling within the scope of the invention.

What is claimed as new is as follows:

1. In combination with a chamber for receiving fluid therein and fluid inlet means for said chamber as well as an inlet valve assembly operatively associated with said fluid inlet means for controllably admitting a predetermined quantity of fluid into the said chamber from a source of fluid under pressure, said inlet valve assembly including a elongated tubular body having inlet and outlet ends, said inlet end being fluid-tight sealed relative to said fluid inlet means, an elongated valve member mounted in said elongated tubular body for longitudinal rectilinear shifting relative thereto between first and second limit positions and including first and second ends, said first end projecting outwardly of said outlet end for extension and retraction relative thereto. responsive to back and forth shifting of said valve member between said first and second limit positions, said second end of said valve member having an enlarged valve head thereon, said tubular body including an annular valve seat through which said valve member extends, said valve head being seatingly engagable with said valve seat upon shifting of said valve member in said tubular body away from said inlet end to said first limit position with said first end portion projecting a maximum predetermined distance outwardly of said outlet end, said chamber and valve member including co-acting means of operative, responsive to said predetermined quantity of fluid being received in said chamber, to cause said valve member to be shifted to said first limit position and terminate the flow of fluid into said chamber said tubular body being disposed upright and said inlet and outlet ends are disposed uppermost and lowermost respectively, said chamber comprising a fluid inflatable flexible bladder including upper and lower bladder panels, said third inlet means being formed in said upper panel.

2. The chamber and valve assembly of claim 1 wherein said elongated tubular body includes shield means therein co-acting with said valve head to shield said valve head against dynamic forces thereon by the flow of fluid passing through said tubular body from said inlet end to said outlet end while said valve member is in said first limit position and during shifting of said valve member from said first limit position to a position a spaced predetermined distance from said second limit position.

3. The chamber and the valve assembly of claim 1 wherein said co-acting means includes a removable extension on said first end of said valve member.

4. In combination with a fluid inflatable chamber for receiving fluid therein and including first and second opposite walls progressively movable away from each other responsive to said chamber being fluid inflated from a deflated condition and including a inflation port in said first wall, an elongated valve assembly having inlet and outlet ends, said inlet end being fluid sealed relative to and supported from said first wall with said valve assembly extending through said inflation port and said outlet end projecting toward said second wall, a valve member shiftably supported from said valve assembly for movement between open and closed limit positions allowing and preventing, respectively, fluid flow through said valve assembly into said chamber, said valve member including chamber wall abutment means extended and retracted relative to said outlet end when said valve member is in said closed and open positions, respectively, said chamber and valve member including co-acting means operative, responsive to a predetermined quantity of fluid being admitted into said chamber, to cause said valve member to shift from said open limit position to said close limit position and terminate the free flow of fluid into said chamber.

5. The chamber and valve assembly of claim 4 wherein said valve assembly outlet end is generally vertically disposed and faces downwardly, said valve member being gravity shiftable to said closed limit position and including a portion thereof extendible and retractable relative to said outlet end responsive to movement of said valve member to said closed and open limit positions, respectively, for engagement with said second wall.

* * * * *